May 26, 1936.　　　E. A. STALKER　　　2,041,791
AIRCRAFT
Original Filed May 17, 1934　　4 Sheets-Sheet 1

INVENTOR
Edward A. Stalker

May 26, 1936.  E. A. STALKER  2,041,791
AIRCRAFT
Original Filed May 17, 1934  4 Sheets-Sheet 2

INVENTOR
Edward A. Stalker

May 26, 1936. E. A. STALKER 2,041,791
AIRCRAFT
Original Filed May 17, 1934   4 Sheets-Sheet 3

INVENTOR
Edward A. Stalker

Patented May 26, 1936

2,041,791

UNITED STATES PATENT OFFICE 2,041,791

AIRCRAFT

Edward A. Stalker, Ann Arbor, Mich.

Application May 17, 1934, Serial No. 726,112
Renewed November 29, 1935

18 Claims. (Cl. 244—12)

This invention contains subject matter common to the applications Serial No. 573,651, filed November 7, 1931, and Serial No. 672,194, filed May 22, 1933, and it relates to aircraft and particularly to modes of sustentation and propulsion. This application is also collateral with two applications, Serial Numbers 726,111 and 726,113 filed May 17, 1934. The objects are the following:

To provide such an airfoil that with a single slot properly located, very high lift coefficients are attainable.

To provide a means of reducing the resistance of slotted wings without the hazards of movable vanes to close the slot or suppress it in effect.

To provide a means of utilizing the high lift of slotted wings so as to suppress the effects of the undesirable large angles of attack accompanying a large lift coefficient.

To provide a means of propulsion which co-operates with the wings to reduce the resistance as well as create a thrust; which cooperates with the wing to suppress the undesirable angular rotations for various speeds of flight; which co-operates with the wing to reduce the resistance due to the slot; which cooperates with the wings to provide high lift coefficients for landing and low drag for high speed automatically; and which co-operates with the wings and fuselage to provide safe vision.

To provide an aircraft which is safe throughout the range of usefulness because it provides the proper conditions and functions in proper sequence with a minimal of attention from the pilot.

To provide a means of propulsion housed within the aircraft and operating with low pressure fluid discharged through the aircraft's surfaces.

Other objects will appear from the appended drawings and description of the invention.

I attain these objects by mechanism illustrated in the accompanying drawings, in which—

Before proceeding with a detailed description of the invention, pertinent phases of the underlying theory are given so that it may be better understood.

In discussing wings, it is convenient to refer this lift and drag to coefficients which are independent of the area of the wing A, the mass density of the air $\rho$, and the speed of the relative wind V. These coefficients are Lift coefficient $$=C_L=\frac{2L}{\rho A V^2}$$

Drag coefficient $$=C_D=\frac{2D}{\rho A V^2}$$

where L and D are the lift and drag respectively. The coefficients are pure numbers and are therefore independent of the units used and each is directly proportional to the lift or drag.

When fluid flows across a body the velocity at the surface of the body is zero and it is some distance out from the body that the full velocity of the local stream is attained. If the body is curved the loss in energy due to friction along the forward portion is such that when the flow reaches the locality where the body begins to contract in cross sectional area the flow leaves the body and a turbulent wake appears which increases the drag of the body greatly. The layer of air retarded by friction is called the boundary layer. If sufficient energy is added to the boundary layer it will not leave the surface but will follow smoothly along it with a consequent reduction in drag. The amount of energy needed is small in comparison with the reduction in drag. The process is called the energization of the boundary layer.

The boundary layer may be energized either by blowing along the surface rearward so as to accelerate the boundary layer or by drawing it into the body. In both cases energy is added to the layer and in both cases the layer is suppressed.

Energization of the boundary layer of a wing will lead to high values of the maximum lift coefficient. The slot through the wing transfers the pressure energy from below the wing to the boundary layer above and so permits very large angles of attack and corresponding high values of maximum $C_L$.

Figures 8, 9, 10:
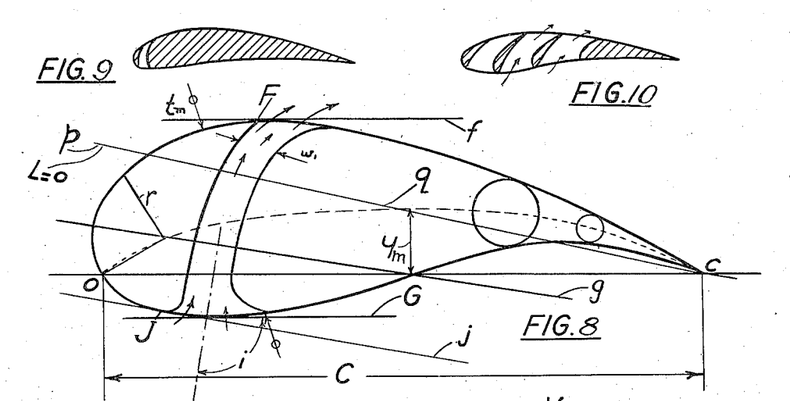
Figures 8 to 16 refer to the theory.

Conventional wings give maximum lift coefficients of about 1.3 and can not exceed values of 2.0. The ultimate value of the maximum lift coefficient is dependent on the height of the mean camber ordinate. The mean camber line is defined by the center of the circles inscribed in the wing section profile so that the circles and contour line of the section are tangent to each other. The chord line is the line subtending the mean camber line or arc. The maximum mean camber ordinate is the ordinate measured from the chord line. Figure 8 shows a typical wing with a maximum ordinate $y_m$ which may be expressed as a fraction $h$ of the chord length C. Then $$C_{L\ max.} = 0.9 + 9h$$

for values of $h$ up to 0.11. All attempts to use a value of $h$ greater than 0.11 have resulted in an actually lower value of $C_{L\ max.}$ than 2. The values of $h$ in use are of the order of 0.05 to 0.08. With the lower values of $h$ it has been found feasible to increase the $C_{L\ max.}$ by incorporating an auxiliary vane ahead of the wing or by putting a slot through the wing at the leading edge. See Figure 9. Slots of this form and location have increased the values of maximum $C_L$ for thin moderately cambered wings. However, when these slots were applied to thick wings the expected increase of about 50 per cent in maximum $C_L$ was not obtained. It has therefore been concluded that a slot (or auxiliary vane is suitable for thin wings only and all experimentation and use have been devoted to this type of slotted wing only. A desire to get still higher lift coefficients has led to the trial of a plurality of slots in the place of one (see Figure 10), but although the lift was increased the drag was increased inordinately so that no multiple slot wing has ever come into use.

I have discovered that a single slot can be used in a thick wing to obtain very high values approaching the theoretical maximum value of $4\pi$ if certain proportions of the wing section and slot are used. As far as I am aware these results and proportions have not been appreciated or disclosed. I am aware, however, that thin high cambered wings of $h$ equal to 0.18 and $t$ equal to 0.10 have been used with a plurality of slots.

I find as a first prerequisite that the wing section must have a higher value of $h$ than those now in use with slots, and this value of $h$ must be combined with a proper thickness; further that only one slot should be used in the middle two-thirds of the chord. In particular I find that $h$ should have a value of 12 per cent or greater and may be as high as 100 per cent—but I prefer 60 per cent as a limit. Coupled with $h$ there should be a thickness $t$, expressed as a fraction of the chord length, greater than 15 per cent. The location of the maximum thickness and in fact the distribution of the thickness must follow a definite rule. The location of the slot is in turn dependent on the value of $h$, $t$ and the location of the latter.

In Figure 8 the mean camber line is indicated by $q$ and the chord line by $oc$. A line $p$ is drawn through the trailing edge and the center of the mean camber line. This line is the direction of the wind for zero lift on the wing; it is called the zero lift line. Draw parallel to $p$ a line $g$ through the end of the nose radius. The intersection of line $g$ with the line $oc$ determines the point G through which the lower surface camber crosses the chord line $oc$. Another line $j$ is drawn parallel to $p$ and determines the point of tangency J. Another line $f$ drawn parallel to $oc$ determines the point of tangency F. The wing section contour is then a smooth curve passing through the points and merging with the nose determined by the radius $r$. The mean camber line is preferably a circular arc of desired height $h$ whose selection will be discussed later.

The preferred parameters of the wing's section may be summed as follows:
$h = 0.12$ to $0.60$
$r = 0.4h$ to $1.0h$
$t = 0.8(h + 0.08)$ to $2.0h$
These values may be permuted in any manner.

The slot should have its entrance on the lower surface no further forward than J, Figure 8, and its exit at the upper surface no further forward than F. The exit of the slot should have a width $w_1$ between ½ and 6 per cent of the chord length C, preferably 1 per cent. The entrance should be larger than the exit, preferably twice as large so that its width would be from 1 to 12 per cent. The entrance should be well rounded and should be readily accessible to the wind pressure. This feature will be ensured if the angle $i$ between the axis of the slot and the line tangent to the contour at the axis is not less than 20 degrees, but preferably the angle $i$ should be about 90 degrees. The slot should discharge rearward at the upper surface.

With the wing sections set forth and a single slot preferably located ahead of the center of the mean camber line and no further forward than described I find that I can use very large values of $h$, higher than any heretofore used, and realize a maximum $C_L$ far in excess of the maximum values previously obtained. In fact I find that with one slot I can obtain values approaching $4\pi$.

The value of maximum $C_L$ for the slotted wing described may be written as $$C_{L\ max.} = 1.5(0.9 + 9h)$$

with the limitation on $h$ raised from 0.11 to 1.0, and the limitation on $t$ for slotted wings raised from about 0.15 to 0.50. The preferred values for all-round performance of the airplane are $h = 0.20$ and $t = 0.30$ except when the means of propulsion described below is used.

Since the landing speed of an airplane is inversely proportional to the square root of $C_L$, an increase of $C_L$ fourfold will cut the landing speed in two. Actually the landing speed could be reduced more because the thicker wing means a lighter wing.

When it is realized that the weight of wings is inversely related to the square of the thickness roughly and that lift per pound of wing structure can now be increased as much as tenfold by the above disclosure, the significance to safe and efficient aircraft will also be apparent.

I have shown how very high lift coefficients may be obtained and it now remains to show how the wing sections may be used so as to obtain a low resistance or drag at high speeds which correspond to low angles of attack and low values of the lift coefficient. It is notorious that all slotted wings have several times the minimum drag of unslotted wings. As a consequence the few slotted wings which have been used were equipped with a means of closing or suppressing the slot. Yet in spite of these devices slotted wings are practically unused commercially. They have found some use in England as adjuncts to lateral control but they are practically unused in this country commercially in any form. Where they have been used they have been discarded eventually because of the hazard in the functioning of the mechanism to close the slot by retracting the auxiliary vane into the nose of the wing, and because of the weight of the mechanism. The increase in lift obtained with the wings to which the slot was considered applicable was actually nearly counterbalanced by the weight of the mechanism. To use a plurality of slots would simply complicate the mechanism for closing, increase the weight exorbitantly as well as demand large angles of attack beyond the range of angles which can structurally be used so that in the end the addition of slots leads to even greater losses. I will discuss the effect on drag and angular range separately.

It is one object of this invention to do away with the need of all flaps to close slots as these require too much mechanism for anyone of ordinary ability. They contain great hazards of functioning, extra weight, and even when functioning properly they require some time to open, close or adjust and in a vehicle as quick as the airplane the time consumed in their operation may be the difference between life and death. I have therefore provided an airplane in which these variable surfaces have been dispensed with.

I eliminate the necessity for a plurality of slots since I realize the ultimate lift with one slot. I consequently provide a wing light to construct because there are only two segments; because the wing thickness is great; and because no closing mechanism is needed for the slot. By using one slot and the wing proportions I have outlined, the resistance which does exist due to the slot is reduced to a minimum for the maximum $C_L$ realizable, and this minimal resistance may be further reduced according to the following principles.

Figure 11:
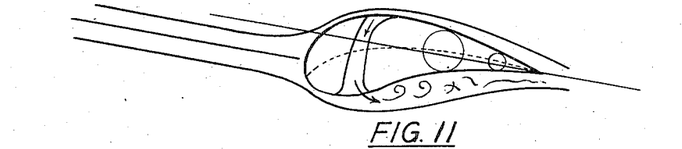

The high resistance of the slotted wing arises, I have found, from the low energy content of air drawn through the slot at low angles of attack. Consider Figure 11 with the angle of attack near zero degrees; the flow still has some curvature outward at the slot entrance and exit. For the type of wing shown, the curvature is greatest near the entrance and hence the suction will be highest near this locality. Then air will be sucked through the slot and out the entrance at low angles of attack. Since the slot exit is not presented directly to the oncoming relative wind, the air drawn out the slot entrance has a low energy content and in the mixing with the air at the lower surface the average energy content of the lower surface flow will be reduced so that the flow will leave the surface and create a high drag—due to the turbulent wake.

At some moderate angles the greatest curvature of the flow will be on the upper surface in which case the suction at the exit will be just greater than that at the entrance. Again work or energy will be lost in drawing the air through the slot and the average energy at the slot exit will be less than normal, resulting in a turbulent wake and high drag. Not until the entrance is subjected to an appreciable pressure will the energy content at the slot exit be normal; this will occur in the upper range of positive angles of attack.

I eliminate the drag due to the slot flow by providing means to reenergize the air. Extending spanwise of the wing and at the front of the through slot entrance I locate a surface slot leading out of the wing interior and formed to discharge rearward along the under surface. See Figure 12. I also locate a surface slot in the upper surface to the rear of the through slot exit and I place both of these slots in communication with a blower so that air may be made to flow through them. In accordance with the boundary layer theory which has been described, an energization of the flow takes place at both surface slots and turbulence and drag are thereby eliminated.

Contemporary thought in aeronautics regards the high resistance of slotted wings as something inherent in their structure. The slotted wing is already equipped with a means of boundary layer energization in the form of the slot and the addition of more boundary layer control in the form of more slots causes a further increase of drag; so that it is not apparent that what the wing needs is boundary layer energization as outlined to obtain low drag. Actually the wing needs the proper combination of types of boundary layer energization—the surface slot and blower combined with the through slot.

Hence with the slot devices I eliminate the need for a slot closing device with its attendant dangers of not functioning at all or unsymmetrically and of consuming the pilot's time and action in an emergency when he should be tending to the maneuvering of the airplane.

Figure 13:
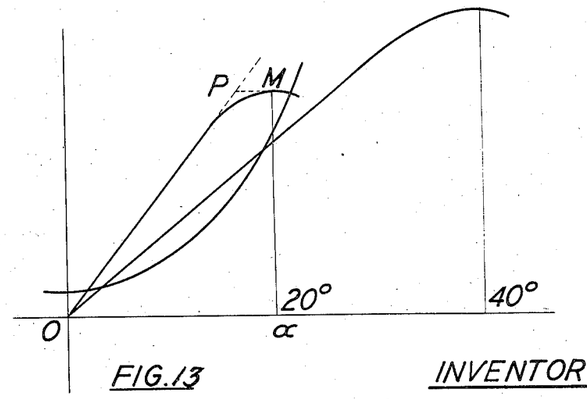

Although the use of a slot increases the maximum $C_L$, the value occurs at a very large angle of attack. In fact the angle is increased proportionately (very closely) to the increase in $C_L$. For instance in a conventional wing, the range of angles from zero lift to maximum is about 20 degrees but if the maximum lift coefficient were increased 50 per cent the angular range would be about 30 degrees. See Figure 13. A quadrupling of the lift coefficient would make the angular range 40 degrees.

In present-day aircraft at landing the angular range is so large that the nose of the airplane obscures the vision forward very seriously, and 20 degrees of rotation is about all that the comfort of the passengers will permit. Furthermore a greater angle would require an unduly long landing gear to achieve the necessary ground angle. Means to rotate the wings relative to the fuselage have been proposed and used but again they add to the weight, demand the pilot's time and present hazards of functioning. I provide a different solution.

Figure 14:
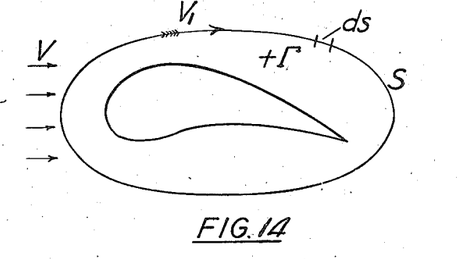

Aerodynamic theory teaches that the lift of a wing arises from a flow about it that may be divided into two components: a rectilinear flow and a circulatory flow as shown in Figure 14. The strength of the circulation flow is defined as the integral of $V_1 ds$, the circulation velocity taken around the curve S. The strength of the circulation, indicated by $\Gamma$ is the same for all closed circulation lines S about the wing. The lift coefficient per foot of span is then $$C_L = \frac{2\Gamma}{CV}$$

where $$\Gamma = \int_s V_1 ds$$

and no allowance is made for tip losses. To make allowances for tip losses the value of $C_L$ should be multiplied by $\pi/4$.

Figure 15:
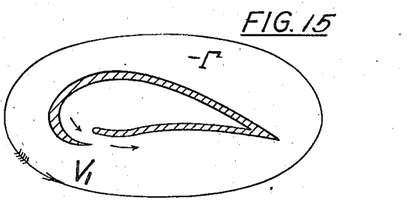

I have found it possible to impose a negative circulation on the wing and thereby reduce the lift without changing the apparent angle of attack. A sheet of fluid blown out the under surface rearward will induce a negative circulation as indicated in Figure 15. Imposing the negative circulation is equivalent to decreasing the angle of attack. In fact the airstream is deflected down and the true angle of attack is decreased.

I use the idea of negative circulation in this manner. I set the wing on the fuselage at large angles of attack in direct opposition to present design practice. The angle of attack is such that the high lifting capacity, that is, high $C_L$ maximum may be used with what rotation of the passengers is comfortable; and for high speed, instead of reducing the angle of attack literally I introduce the negative circulation which reduces the lift coefficient and permits the airplane to fly at high speed horizontally.

Present-day wings are set on the fuselage so that when the airplane is flying with a horizontal thrust line the angle of attack of the wing corresponds to the maximum ratio of lift to drag. It may be shown further that when the ratio is a maximum $$C_L = \sqrt{\pi R C_{DP}} \quad (1)$$

where R is the aspect ratio and $C_{DP}$ is the profile drag coefficient of the wings, $\pi$ has its usual value and significance. Corresponding to this value of $C_L$ is the angle of attack $$\alpha_1 = \frac{d\alpha}{dC_L} C_{L1} \quad (2)$$

where $$\frac{d\alpha}{dC_L}$$

is the reciprocal of the slope of the lift curve $$\frac{dC_L}{d\alpha} = \frac{5.35R}{\pi R + 5.35}$$

Then $$\alpha_1 = \frac{57.3(\pi R + 5.35)}{5.35 \pi R} \sqrt{\pi R C_{DP}} \quad (3)$$

in degrees.

The profile drag coefficient of the wing is a function of its thickness and is given by $$C_D = 0.01 + 0.01t + 0.1t^2$$

Hence $$\alpha_1 = \frac{3.4}{R}(\pi R + 5.35)\sqrt{\pi R(0.01 + 0.01t + 0.1t^2)} \quad (4)$$

in degrees. This is the angle of set of wings on present-day airplanes. I use values much higher but, of course, do not exceed the maximum angle for the wing with the slot. The maximum angle of set which would be practicable is $$\alpha_m = \frac{\pi R + 5.35}{5.35 \pi R} 4\pi$$

in radians, $$= \frac{43}{R}(\pi R + 5.35) \quad (5)$$

in degrees.

With a conventional wing the angle between the ground line and the zero lift line is $$\alpha_3 = \frac{3.4}{R}(\pi R + 5.35)(0.9 + 9h) + 4 \quad (6)$$

in degrees. The 4 degrees are to take account of the curved extension of the curve from P to M. See Figure 13. I use a value of $\alpha_2$ between that given by equation (6) and $\alpha_m$ given by equation (5). When the designer selects his maximum $C_L$ for the desired landing speed $h$ is determined, and the product $Rh \geq 0.60$ will, in conjunction with the Equations (5) and (6) define the limits for the claims. It is also necessary to define the product $Rt \geq 0.90$ to specify $\alpha_1$ unambiguously. R, t and h may have any value individually and the products define preferred values never before used or proposed.

It is one of the objects of this invention to provide a safe airplane and so all the parts and the sequence of functions must cooperate to this end. Adequate vision is one of the prime requisites of safety and I arrange the mode of propulsion so that one of the main obstructions to vision is eliminated. This is the nose engine. At the same time I eliminate the hazards of the exposed propeller by enclosing it in the aircraft. I then arrange the wings, fuselage, engine and means of blowing so that all cooperate toward the object of safe and economical propulsion.

I am aware that propellers and compressors have been placed in a fuselage before but none have been successful and all violate the theory upon which I proceed and which I have found successful.

Figure 16:
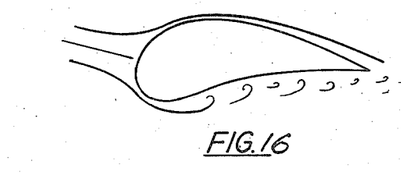

I proceed on the theory that it is more desirable to reduce the resistance than to overcome it. The method of reducing the resistance is to eject a sheet of air or other fluid in the vicinity where the aircraft surfaces tend to turn from the flow. That is, where the surface has such a curvature that the flow would normally leave, I eject a sheet of fluid rearward along the surface to energize the boundary layer and prevent the flow from separating and forming a turbulent wake. In Figure 16 a wing section is shown with a turbulent wake arising at the lower surface of the nose. A jet blown out the slot as shown in Figure 15 would induce a smooth flow along the under surface.

I also induct air from the aircraft surface near localities where the flow tends to separate so that the boundary layer is removed by suction and the flow is made to follow the aircraft contour. By these means I make the ejected fluid serve the dual purpose of reducing the resistance and of creating a thrust. The momentum reaction of the discharged fluid provides the propelling thrust and the drag reduction is in major part a concurrent donation. Boundary layer energization is useful only where the surface tends to turn from the flow aft of the jet exit. A high velocity jet ejected along a practically flat surface or one turning toward the flow will increase the resistance of the surface because the friction will be larger; and there is no danger that the flow will leave the surface, so that the jet is superfluous.

In the wings of this invention the under surface is curved to conform to the high camber and to develop the high lifting capacity desired. Then to mitigate the high resistance at low angles of attack the sheet or jet is discharged along the under surface at the proper locality to induce the relative flow to follow the surface tending to turn from the flow.

The fluid jets or sheets must not be ejected with such high pressures that the jet attains anywhere near the velocity of sound and for this reason the pressures should not exceed 7.35 pounds per square inch. At this pressure 80 per cent of the velocity of sound is reached at the exit of the nozzle and if the fluid flows on a curved surface such as possessed by a wing or fuselage the velocity will attain the velocity of sound. Failure to follow the surface would defeat the purpose of the jet which is to decrease the resistance and provide a thrust simultaneously.

In order to provide velocities of the proper magnitude I provide a blower that will handle large volumes of fluid at relatively low pressures of the order of 7 lb. per sq. in. or less. The most efficient blower for this purpose I find to be an impositive type having vanes of airfoil form rotating about a parallel axis. For the low pressures and high volumes involved this type is more efficient and lighter than the positive type pump wherein the volume is appreciably changed before the air is discharged from the pump.

I provide the blower with an adequate mass of air and make the induction inlets serve another purpose besides the simple function of passing the air. The inlet opening or openings are disposed along the span of the wing and about the body so as to serve the purpose of energizing the boundary layer by suction. As pointed out earlier this type of energization reduces the resistance of the fuselage or wing. The openings in the fuselage for the induction of the air are placed so that the suction force is normal to the direction of motion. This will avoid a backward component of suction which in the case of a low resistance body may be an appreciable percentage increase in drag.

Figure 12:
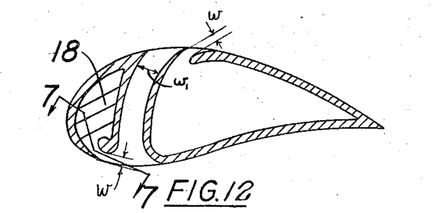

The surface slot width $w$, Figure 12, should be of the order of the width $w_1$ of the through slot exit, in other words from ½ to 6 per cent of the chord C. I prefer a value of approximately 1 per cent. There is, however, a minimum value for the slot width because the surface slows up the fluid very close to itself and the layer of fluid retarded is always about the same thickness. I find that the thickness of the jet and therefore the width of the slot should not be less than $\frac{1}{32}$ of an inch. It is also desirable that the walls of the slot overlap to some extent and preferably for a length equal to the width $w$. Overlap will ensure that the jet is discharged along the surface rather than normal to the surface.

When the wing is set at a large angle of attack on the fuselage, larger than normal and a device dependent on the relative wind is incorporated so that there is a reason for setting the wing at a large angle, namely, to utilize the high lifting capacity for landing, then there is need for a sheet or jet discharged rearward along the under surface to induce a counter circulation about the wing irrespective of whether the under surface is curved or not.

I do not claim an under surface jet broadly but only when it can and does reduce the resistance or there is need to reduce the lift, that is, the effective angle of attack.

Vision in the forward hemisphere I find to be essential for safe operation of an aircraft. By this I mean that the pilot should be able to see directly vertically, forward and laterally—or along any intermediate ray. Due to the means of propulsion and the means of altering the lift of the wings I succeed in satisfying to a large extent the above condition of vision. It will be supplied directly upward and to some extent rearward because the pilot may be located ahead of the wing with the engine behind to counterbalance the weight of the occupants. It may be supplied directly forward even in landing because it is not necessary to rotate the whole airplane to large angles to secure the maximum lift. The wings are to be already set at a large angle relative to the fuselage. It will be clearly supplied laterally and somewhat rearwardly. In the downward direction, vision is available along the side of the body and downward through a transparent section in the floor and forward nose and side walls of the body. This would not be possible with the motor in the forward nose.

The propulsive unit should also be at the rear of the cabin compartment so that it may easily obtain the requisite mass of air for efficient propulsion. With the rearward location it is now feasible to withdraw air from the surfaces of the wings and body and discharge the air through the surfaces of the same parts without interfering with the vision or comfort of the occupants.

Referring more particularly to the Figures 1, 2, 3, and 4 it may be observed that the wing is denoted by 1, the fuselage by 2, the landing gear by 3, and the vertical tail surfaces by 4. The horizontal tail is 5.

Figure 1:
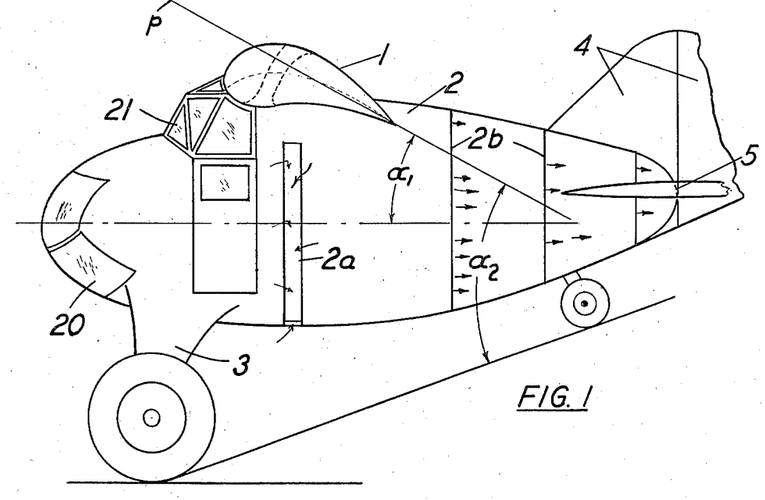
Figure 1 is a side elevation of the aircraft.
Figure 2:
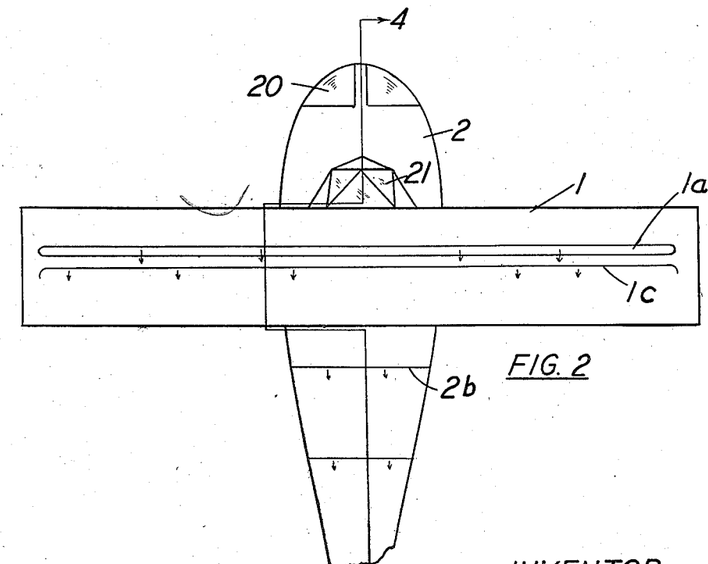
Figure 2 is a fragmentary plan view of the aircraft.
Figure 3:
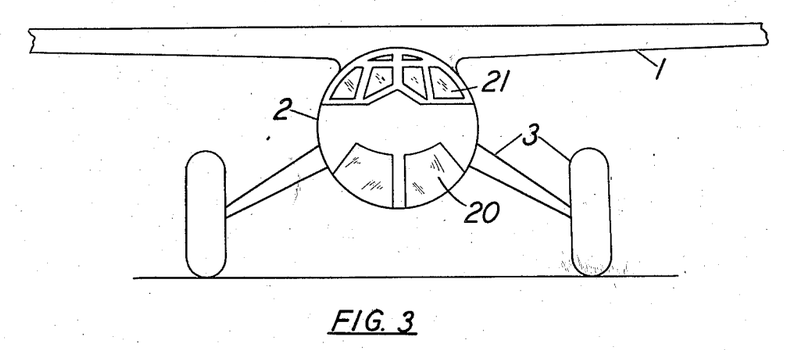
Figure 3 is a front elevation of the aircraft.
Figure 4:
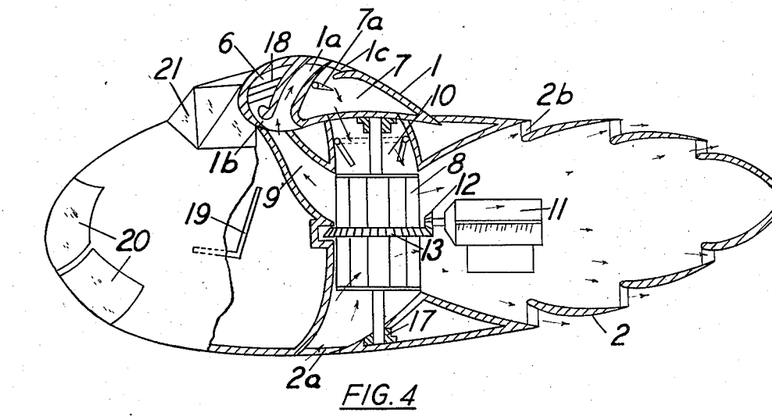
Figure 4 is a fragmentary vertical section along the line 4—4 in Figure 2.

In Figures 2 and 4 the through slot is indicated by $1a$ with its inlet in the lower surface and its exit in the upper surface of the wing. The slot extends spanwise to within a few inches of the wing tip.

The surface slots $1b$ and $1c$ are shown in Figure 4 and they too extend to within a few inches of the wing tip.

The wing is divided into two compartments 6 and 7 by the walls of the through slot and each surface slot ($1b$, $1c$) communicates with one of the slots.

The compartments 6 and 7 are in communication with a blower 8 by means of the ducts 9 and 10 shown in Figure 4. Air is inducted at the slot $1c$ and in part blown into compartment 6 from which it flows through the lower surface slot $1b$.

Figure 5:
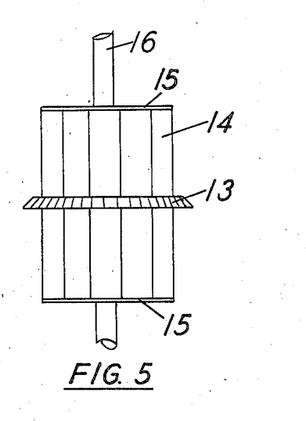
Figure 5 is a side elevation of the blower.
Figure 6:
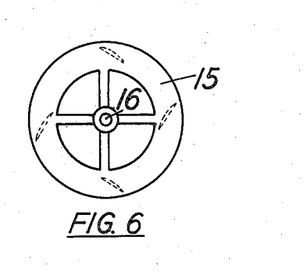
Figure 6 is an end view of the blower.

The blower 8 is driven by gears 12 and 13 by the engine 11, and draws its air from the opening $2a$ in the fuselage side. The air is discharged in part out slot $2b$ in the fuselage side. The sides of the fuselage are curved longitudinally and the slots extend peripherally about its transverse sections. Figures 5 and 6 show the elevation and plan of the blower 6. It consists of vanes 14 attached by annular plates 15 to a central shaft 16. In the airplane the shaft is rotatably supported in the bearings 17.

Within the compartment 7 and extending along the full length of the slot is a flap $7a$ hinged to the rear wall of the through slot. While the blower is operating the flap is pulled down into the position shown by the inflow through the surface slot $1c$. If the blower fails to function the suction above the wing will pull the flap upward against the lip of $1c$ and thereby seal the upper surface of the wing from the interior of the wing which would be subjected to pressure because of the influx of air from the fuselage openings. If a flow were permitted outward through the opening $1c$ the lift would be decreased.

Figure 7:
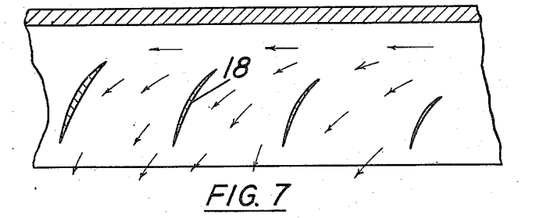
Figure 7 is a fragmentary section along line 7—7 in Figure 12 to show the guiding vanes.

Fluid blown into the wings at one locality as, for instance, the center of the span, has a tendency because of its inertia to pack toward the wing tip. As a result more fluid tends to be discharged through the slots $1b$ and $1c$ near the wing tip than through the inner portions of the slot. For best efficiency the fluid should be discharged fairly uniformly along the major length of the span. To achieve this distribution I insert vanes 18 (Figures 12 and 4) within the compartments. To preserve clearness in the figures I show these vanes only in the front compartment but they should also be inserted in the rear compartment. They are also shown in Figure 7. Proceeding in the direction of the flow each succeeding vane projects further into the stream so as to capture the volume of fluid to be discharged from the slot at a certain locality along the span.

I have located the blower and engine to the rear of the pilot or passenger compartment so as to leave an unrestricted field of vision ahead and particularly downward—as described earlier. The pilot's chair is 19 and seated in it he may see downward through the windows 20 and forward through 21. In fact if desired the whole front surface may be made transparent.

Returning to Figure 1 it may be observed that the wing is set on the fuselage so that the angle $\alpha_1$ with respect to the thrust axis is far larger than ordinarily used. This is in accordance with the theory stated earlier. Likewise the angle $\alpha_2$ between the zero lift line and the ground line is large. Values of $\alpha_1$ and $\alpha_2$ are to be determined by Equations (4), (5) and (6).

I have used the term slot broadly to mean a long narrow opening or any distributed set of openings since in the latter case by placing the openings close together a slot could be formed as a limiting case.

I have illustrated rectangular wings but it will be clear to those skilled in the art that the disclosure applies to tapered wings. It is only necessary to refer the magnitudes of terms to the mean aerodynamic chord.

While the form of apparatus herein described constitutes a preferred embodiment of the invention it is to be understood that the invention is not limited to these precise forms of apparatus, and that changes may be made therein without departing from the scope of the invention which is defined in the appended claims.

What I claim is:

1. In an aircraft associated with a relative wind, a wing having a through slot directed upward and rearward from the under side to the upper side, said slot giving rise to high lift at high angles of attack and high drag at low angles, said slot having walls virtually closed to the influx or efflux of the relative wind and being sufficiently unobstructed to a flow therein to preserve the major portion of the energy per unit of mass of the relative wind in flowing through the slot, said wing having a spanwise compartment within and a divided lower surface to form a surface slot in communication with the spanwise compartment within the wing, and a means of blowing in communication with said compartment so that a flow of fluid is directed through the surface slot to reduce the resistance arising from the through slot.

2. In an aircraft, a wing having a through slot from the under side to the upper side formed with an exit wider than $\frac{3}{32}$ of an inch and $\frac{1}{2}$ per cent of the chord length, said slot being directed upward and rearward and extending along a major portion of the semi-span and giving rise to high lift at high angles of attack and high drag at low angles of attack, a perforated lower surface of the wing to form an opening at a side of the entrance of the through slot, said opening being in communication with the wing interior, and means to cause a flow through the lower surface opening to reduce the resistance due to the through slot.

3. In an aircraft, a wing having a through slot directed upward and rearward from the under side to the upper side, said through slot extending spanwise along a major portion of the semi-span and being sufficiently unobstructed to a flow therein to preserve the major portion of the energy per unit of mass of the relative wind in flowing through the slot, said through slot having an exit width greater than $\frac{3}{32}$ of an inch and $\frac{1}{2}$ per cent of the chord length and giving rise to high lifting capacity at high angles of attack and high drag at low angles of attack, said wing having a divided lower surface of the wing to form a discharge slot in the lower surface ahead of the entrance to the through slot and means to cause a flow through the lower surface slot to reduce the drag due to the through slot.

4. In a wing associated with a relative wind and constructed with a forward portion and a rearward portion to form therebetween a slot directed upward and rearward and extending through from the under side to the upper side of the wing and along the major portion of the semi-span, said slot containing a flow arising from the wind pressures about the wing and being sufficiently free of obstruction to the flow to preserve the major portion of the energy per unit of mass of the relative wind in flowing through the slot thereby providing a desirable high lift and an undesirable augmentation of the drag, a divided lower surface of a portion to form a surface slot in communication with the wing interior, and a means of blowing in communication with the surface slot to cause a flow therethrough independently of the said wind induced flow in the through slot to reduce the said augmentation of the drag arising from the said through slot.

5. In a wing associated with a relative wind, a wing body having a through slot from the under side to the upper side extending along a length greater than the major portion of the semi-span of the wing and being sufficiently free of obstruction to a flow therein to preserve the major portion of the energy per unit of mass of the wind in flowing through the slot, a wing section having a maximum mean camber ordinate greater than 12 per cent of the chord length, and a thickness greater than 20 per cent of the chord length, said through slot being the sole through slot between the points on the chord at 10 per cent and 60 per cent of the chord length from the leading edge.

6. In a wing associated with a relative wind, a wing body divided into a front portion and a rear portion to form therebetween a through slot extending along a major portion of the semi-span and sufficiently free of obstruction to a flow therein to preserve a major portion of the energy per unit of mass of the relative wind in flowing through the slot, said wing having a mean camber height greater than 12 per cent of the chord length and a thickness greater than 20 per cent, and said slot being located so that its entrance is to the rear of the point of tangency of the line parallel to the zero lift line and tangent to the under surface of the wing.

7. In a wing, a wing body divided into a forward portion and a rearward portion to form therebetween a through slot extending upward and rearward along a major portion of the semi-span and being sufficiently free of obstructions to the flow to preserve a major portion of the energy per unit of mass of the relative wind in flowing through the slot, said wing having a mean camber height greater than 12 per cent of the chord length and a thickness greater than 20 per cent, and said slot being located so that its exit is to the rear of the point of tangency of a line parallel to the chord line and tangent to the upper surface of the wing.

8. In an aircraft, a fuselage, a wing to support the fuselage and having a through slot from the under surface to the upper surface to augment the maximum lifting capacity, said wing being set on the fuselage so that the angle between a horizontal line in the fuselage when the airplane is flying level at maximum speed and the zero lift line of the wing lies between $$\alpha_1 = \frac{3.4}{R}(\pi R + 5.35)\sqrt{\pi R(0.01 + 0.01t + 0.1t^2)}$$

and $$\alpha_m = \frac{43}{R}(\pi R + 5.35)$$

for the product of R by $t$ equal to or greater than 0.90, said wing having a divided lower surface of the wing to form a rearward directed slot, and a means of blowing in communication with said slot so that a fluid jet is dischargeable rearward to reduce the lifting capacity for high speed flight.

9. In an aircraft, a landing gear, a hollow wing having a through slot from the under surface to the upper surface to create a high lifting capacity but giving rise to an undesirably large range of angles of attack between zero lift and maximum lift, means to make feasible the use of the high lifting capacity at landing comprising a setting of the aircraft on the landing gear so that the angle in degrees between the ground line and the zero lift line of the wing is between $$\alpha_2 = \frac{3.4}{R}(\pi R + 5.35)(0.9 + 9h) + 4$$

and $$\alpha_m = \frac{43}{R}(\pi R + 5.35)$$

for the product of R by $h$ equal to or greater than 0.60, and means to make feasible high speed flight without a large negative rotation of the wing comprising a divided lower surface of the wing to form a rearward directed spanwise slot, a means of blowing and a prime mover to operate it, means of communication between the means of blowing and the slot so that a fluid jet is dischargeable to set up a negative circulation to reduce the effective angle of attack for high speed flight.

10. In an aircraft, a wing having an opening in its upper surface, a perforated surface of the aircraft to provide an opening, a principal means of propulsion comprising a means of blowing directing a major portion of its discharged fluid into the aircraft interior and a prime mover to actuate it, means of communication between the means of blowing and the said openings so that a fluid jet is dischargeable rearward to serve the dual purpose of energizing the boundary layer to reduce the resistance and of creating a thrust, wing walls extending spanwise and spaced apart to form a through slot to convey the relative wind from below to above the wing, said slot having an entrance width at the lower surface of the wing greater than $\frac{3}{32}$ of an inch and $\frac{1}{2}$ per cent of the chord so as to make feasible the augmentation of the maximum lifting capacity, and means to seal the said upper surface opening from air of low energy content so as to preserve the said augmentation of the lifting capacity of the through slot in the event the blowing means fails to function.

11. In a wing, a wing body divided into a forward portion and a rearward portion to form therebetween a through slot extending upward and rearward along a major portion of the semi-span and sufficiently free of obstruction to the flow to preserve the major portion of the energy per unit of mass of the relative wind in flowing through the slot, said wing having a mean camber height of between 12 and 60 per cent of the chord and a maximum thickness of between 20 and 40 per cent of the chord.

12. In an aircraft, a wing having a through slot from the under surface to the upper surface and extending along the span, said slot giving rise to high lifting capacity at large angles of attack and high drag at low angles of attack, and means to reduce the drag at low angles of attack to facilitate high speed flight comprising a perforated lower surface to form a surface opening, a means of blowing in communication with the surface opening to cause a flow therethrough, and an airfoil section such that the wing surface aft of the surface opening turns from the flow virtually at the surface opening.

13. In an aircraft, a hollow wing having walls forming a through slot from the under surface to the upper surface and extending along an appreciable portion of the span, said slot giving rise to large lifting capacity at large angles of attack and a high resistance at low angles of attack, a principal means of propulsion comprising a means of blowing directing a major portion of its blown fluid into the wing interior, and a prime mover to actuate the means of blowing, said wing having a divided surface of the wing to form a discharge slot in communication with the wing interior so that a fluid jet is dischargeable rearward to serve the dual purpose of reducing the said resistance by energizing the boundary layer and of creating a thrust.

14. In an aircraft associated with a relative wind, a wing having walls extending along the span and through the wing spaced apart to form a through slot to convey the relative wind from the under side to the upper side, said through slot being sufficiently unobstructed to preserve the major portion of the energy per unit mass of the relative wind in flowing through the slot, said through slot giving rise to an augmentation of the maximum lift coefficient at large angles of attack and high drag at low angles of attack, said wing having a perforated under surface to form a surface slot directed rearward, a principal means of propulsion comprising a means of blowing directing a major portion of its fluid discharge into the aircraft and a prime mover to actuate it, and means of communication between the means of blowing and the said surface slot so that a fluid jet is dischargeable rearward to serve the dual purpose of reducing the said drag and of creating a thrust.

15. In an aircraft associated with a relative wind, a wing having walls extending along the span and through the wing spaced apart to form a through slot conveying the relative wind from the under side to the upper side, said through slot having an exit area smaller than the inlet area so as to provide an augmentation of the maximum lifting capacity, said through slot giving rise to an undesirable high drag, said wing having a perforated lower surface to form a spanwise slot, and a means of blowing to cause a flow through said lower surface slot to reduce the said undesirable drag.

16. In an aircraft associated with a relative wind, a wing having walls extending along the span and through the wing spaced apart to form a through slot directed upward and rearward conveying the relative wind from the underside to the upper side to create an augmentation of the lift for slow speed flight, said slot giving rise to a high drag for high speed flight, said wing having a perforated surface to form a rearward directed surface slot of width greater than $\frac{1}{2}$ per cent of the chord length and $\frac{1}{32}$ of an inch, a propulsive means of blowing creating a fluid pressure less than 7.35 pounds per square inch, and means of communication between the means of blowing and the said surface slot so that a fluid jet is discharged rearward to reduce the said drag of the wing.

17. In an aircraft associated with a relative wind, a wing having walls extending along the span and through the wing spaced apart to form a through slot conveying the relative wind from the under side to the upper side to create an augmentation of the lift for slow speed flight, said through slot giving rise to an undesirable high drag at low angles of attack and having an exit area less than the inlet area, said wing having a perforated surface to form a surface slot, an impositive type of blower and a thermodynamic power means to actuate it, and means of communication between the said surface slot and the blower to cause a flow through the surface slot to reduce the said drag arising from the through slot in the wing.

18. In an aircraft, a wing constructed with a forward portion and a rearward portion to form therebetween a through slot from the under side of the wing to the upper side, said through slot having a width greater than $\frac{1}{32}$ of an inch and $\frac{1}{2}$ of one per cent of the chord length so as to convey a sufficient flow of air to cause an augmentation of the maximum lift, said slot extending spanwise along a major portion of the semi-span, said wing having divided upper and lower surfaces to form rearward directed surface slots in communication with the wing interior, means to eject fluid jets from the slots along the wing surface, and means to alter the flow differentially between the upper and lower surface slots.

EDWARD A. STALKER.